(12) United States Patent  
Mohel et al.

(10) Patent No.: US 9,312,751 B2  
(45) Date of Patent: Apr. 12, 2016

(54) DEVICE AND METHOD FOR PREVENTING WIRETAPPING THROUGH POWER SUPPLY LINES

(75) Inventors: Ron Mohel, Bazra (IL); Adam Owsianko, Netanya (IL); Albert Seloni, Givat Ada (IL); Rachel Dvash, Netanya (IL); Avner Yefet, Neve Efrayim (IL)

(73) Assignee: HELIUS SOLUTIONS LTD, Bnei-Brak (IL)

( * ) Notice: Subject to any disclaimer, the term of this patent is extended or adjusted under 35 U.S.C. 154(b) by 925 days.

(21) Appl. No.: 13/519,380

(22) PCT Filed: Dec. 28, 2009

(86) PCT No.: PCT/IL2009/001221  
§ 371 (c)(1),  
(2), (4) Date: Oct. 19, 2012

(87) PCT Pub. No.: WO2011/080728  
PCT Pub. Date: Jul. 7, 2011

(65) Prior Publication Data  
US 2013/0026845 A1    Jan. 31, 2013

(51) Int. Cl.  
*H05K 9/00* (2006.01)  
*H02M 1/44* (2007.01)

(52) U.S. Cl.  
CPC ........................................ *H02M 1/44* (2013.01)

(58) Field of Classification Search  
CPC .................... G06K 19/073; G06F 2207/7219  
USPC .......................................................... 307/89  
See application file for complete search history.

(56) References Cited

U.S. PATENT DOCUMENTS

| 5,086,467 | A | * | 2/1992 | Malek | H04K 3/825 327/100 |
| 5,177,430 | A |   | 1/1993 | Mohel |  |
| 5,911,119 | A | * | 6/1999 | Bartholomew | H04B 3/54 455/402 |
| 6,507,913 | B1 | * | 1/2003 | Shamir | G06K 19/073 713/300 |
| 7,375,502 | B2 | * | 5/2008 | Malherbe | G06K 19/073 323/268 |
| 2009/0063602 | A1 |  | 3/2009 | Lee et al. | |

FOREIGN PATENT DOCUMENTS

EP  1098267 A1 * 5/2001  
EP  1113386 A2   7/2001

OTHER PUBLICATIONS

International Search Report for PCT/IL2009/001221, dated Sep. 2, 2010.

* cited by examiner

*Primary Examiner* — Hal Kaplan  
*Assistant Examiner* — Elim Ortiz  
(74) *Attorney, Agent, or Firm* — Mark M. Friedman

(57) ABSTRACT

A anti-wiretapping device includes a power input, a power output for energizing anti-wiretapping electronic equipment, at least two dischargeable power storage units, and a control unit for selectively connecting the power storage units to the power input and to the power output, such that when one of the power storage units is connected to the power output it is switched off from the power input. At least one power storage unit is connected to the power input for charging during a connection of the other power storage unit to the power output for energizing the electronic equipment.

9 Claims, 4 Drawing Sheets

DEVICE AND METHOD FOR PREVENTING WIRETAPPING THROUGH POWER SUPPLY LINES

RELATED APPLICATIONS

The present application is a National Phase of International Application Number PCT/IL2009/001221, filed Dec. 28, 2009.

FIELD OF THE INVENTION

The present invention relates to the field of securing electronic equipment against eavesdropping through power supply lines.

BACKGROUND OF THE INVENTION

Rapid industrial development during last decades has enormously increased the numbers of electronic equipment such as computation & communication devices, machinery, storage and archiving facilities, employed by governmental authorities, national security entities, industrial and commercial organizations, small businesses, and individuals. The amounts of sensitive, confidential or classified information processed and stored on electronic devices have increased accordingly.

At the same time, processing power has been improved, based on the availability of more sophisticated algorithms and on faster microprocessors reachable at ever decreasing prices.

While encryption methods for protecting confidential information processed and saved in the memories of electronic devices are undergoing continuous improvement, methods for retrieving data through eavesdropping, hacking and wiretapping are also evolving at ever increasing pace, taking advantage of the same improved computation and processing abilities.

One known eavesdropping method is by wiretapping power supply lines through which target electronic equipment is energized. Since changes in electronic state of the equipment involve corresponding changes in energy consumption, it is possible to retrieve information of interest processed or displayed on target equipment, by analyzing and decoding signals appearing on its power supply lines in correlation with power consumption of internal processes.

Method and equipment have been developed in order to protect information against wiretapping through power lines. These are generally based on improving filtration and on providing electronic noise on power lines, thereby complicating possible retrieval of valuable information from the lines. However, as mentioned above, hacking and wiretapping methods are continuously improved, such that even distorted, encrypted or filtered information associated with internal processes appearing on a power line is potentially retrievable by sufficiently sensitive and sophisticated equipment.

Elimination of data associated with internal processes of electronic equipment from power supply lines may be achieved by battery operated equipment, i.e. by simply giving up the use of power supply lines as means for energizing electronic equipment in real time. However this solution involves significant increase in expenses and in weight, while being incompatible with most existing equipment.

Method and a device are thus required which will eliminate data associated with internal processes of electronic equipment from power lines, in a cost effective manner.

SUMMARY OF THE INVENTION

In a first broad aspect the invention relates to an anti-wiretapping device, comprising a power input to be connected to a power supply line, a power output for energizing electronic equipment intended for anti wiretapping protection, at least two dischargeable power storage units, and a control unit for selectively connecting the power storage units to the power input and to the power output, such that when one of the power storage units is connected to the power output it is switched off from the power input under control of said control unit, and wherein at least one power storage unit is connected to the power input (preferably through a charging converter and/or additional supportive circuitry) for charging during a connection of another power storage unit to the power output for energizing the said electronic equipment.

In the context of the present invention the term "charging converter" refers to any electronic circuit configured to convert electrical power consumed from a power supply line into a charging current for charging dischargeable power storage units connected to it cyclically for charging time intervals for effectively energizing electronic equipment between said charging time intervals. Accordingly, in the presence of a charging converter, switching off a power storage unit from the charging converter constitutes its switching off the power input thereby separating the power storage unit from the power supply line and from undesired real time electrical influence between the electronic equipment and the power supply line.

Due to the inventive device direct electrical power flow between the power line and the electronic equipment is avoided and the electronic equipment is at least satisfactorily not being powered directly from the power line. The power supply line is thus at least substantially neutralized from signals that may be correlated with power consumption signals for retrieving confidential information.

Preferably each of the power storage units comprises at least one capacitor to be charged from the power line during a first time interval and to be discharged while energizing the electronic equipment during a second time interval substantially separate from the first.

In a preferred embodiment of the invention the control unit is configured to regulate the charging duration of a capacitor in a power storage unit being charged based on a feedback from the discharging process of a capacitor in a power storage unit currently connected to the power output for energizing the electronic equipment thereby being discharged. By such regulation the charging process may normally be accomplished using small or moderate charging currents without risking the continuity of power supplied to the electronic equipment, while the max available charging current of the device can be utilized only in emergency cases, normally for short time intervals, to enable timely switching between the capacitors even when the discharging process of the capacitor connected to the power output becomes intensive for any reason.

In various embodiments adaptation of the charging duration of a capacitor in a power storage unit is implemented by automatically selecting a charging current level from a plurality of predetermined current levels available from a charging converter of the device, wherein the selection of a current level is based on a voltage level of a capacitor in a power storage unit currently connected to the power output and being discharged while energizing the electronic equipment, such that whenever the voltage of a capacitor in a power storage unit being discharged during its connection to the power output crosses down a predetermined reference voltage threshold, a higher charging current level is selected for a capacitor in a power storage unit being charged from the power supply line through the charging converter.

A current consumed from a capacitor currently connected to a wiretapping protected line through which the electronic equipment can be energized may also be monitored according to the present invention, and a charging duration of a counterpart capacitor currently being charged by energy taken from a power supply line may be regulated based on said monitored current.

The capacitors are of a capacity sufficient for energizing a large number of cycles of confidential internal processes in the electronic equipment before their voltage drops from one reference voltage to another, thus completely avoiding any undesirable correlation between signals associated with the charging process which may appear on the power supply line and between signals associated with confidential data being processed.

In various embodiments, switching the power storage units from the power supply line to the electronic equipment and vice versa is implemented by double switching units connecting and disconnecting simultaneously both the positive and negative poles of a power storage unit per each switching action, thereby preventing even single line wiretapping.

Additionally to its wiretapping prevention capabilities the inventive device may be applied for protecting electronic equipment from power disturbances and from electronic noise by isolating its power supply from direct feeding from an external power supply generator or network. The protection is bidirectional, i.e. since the device separates the power supply line from the electronic equipment by avoiding direct connection between them, the power supply line becomes protected against electronic noise generated by the electronic equipment.

It is similarly appreciable that the invention may be carried out such that the charging duration of a capacitor in a power storage unit is regulated by either automatically selecting a charging current level from a plurality of predetermined current levels as described hereinbefore, or alternatively by varying the charging current value continuously based on a continuous feedback from the voltage value of the capacitor in the power storage unit being discharged.

The device of the present invention can be manufactured either as a shelf product to be connected between an external power input plug of an electronic equipment and a conventional wall outlet, or at the entrance of the power input to electronic equipment or as an integral unit connected to or embedded within the casing of an electronic device as a mediating unit between a power input and an internal circuitry thereof.

The invention further concerns methods for eliminating direct dependency between signals appearing on the power supply line and signals appearing in internal circuitry of the electronic equipment:

A method for protecting power supply lines against wiretapping is disclosed, comprising initiating a routine having the steps of:
(a) providing an electrical current from a public power line and accumulating said current in a first capacitor as an electrical charge being of a voltage and of amount capable of energizing an electronic equipment for a time duration through which a plurality of electronic processes to be protected against wiretapping may be carried out by energy provided from the first capacitor;
(b) disconnecting said first capacitor from the public power line and connecting it to a line through which the electronic equipment can be energized;
(c) providing an electrical current from the public power line and accumulating said current in a second capacitor as an electrical charge being of a voltage and of amount capable of energizing the electronic equipment for a time duration through which a plurality of electronic processes to be protected against wiretapping may be carried out by energy provided from the second capacitor;
(d) disconnecting said second capacitor from the public power line and connecting it to the line through which the electronic equipment can be energized;
(e) substantially simultaneously with said step 'd' disconnecting the first capacitor from the line through which the electronic equipment can be energized and once again initiating said routine;
(f) repeating the routine as long as energizing the electronic device in the anti wiretapping method is desired.

In a preferred embodiment of the method, the voltage on a capacitor currently connected to the line through which the electronic equipment can be energized is monitored, and a charging duration of a counterpart capacitor currently being charged by energy taken from a power supply line is regulated based on level changes in the monitored voltage.

In various embodiments of the method the charging duration of a capacitor currently being charged by energy taken from a power supply line is regulated by selecting a current level selected from several substantially fixed and predetermined current levels of a charging converter of the device.

In various embodiments of the method, current consumed from a capacitor currently connected to the line through which the electronic equipment can be energized is monitored, and a charging duration of a counterpart capacitor currently being charged by energy taken from a power supply line is regulated based on said monitored current.

A method for protecting electronic equipment against power disturbances and electronic noise which may occur on power lines from which the electronic equipment may be fed, as well as for protecting the power lines from electronic noise generated by the electronic equipment is also disclosed, comprising initiating a routine having the steps of:
(a) providing an electrical current from a power line external to the electronic equipment and accumulating said current in a first capacitor as an electrical charge being of a voltage and of amount capable of energizing an electronic equipment for a time duration through which a plurality of electronic processes (either (i) to be protected against power disturbances or against electronic noise which may occur on the external power line, or (ii) electronic noise generated by whom is to be avoided from the power line) may be carried out by energy provided from the first capacitor;
(b) disconnecting said first capacitor from the external power line and connecting it to a line through which the electronic equipment can be energized;
(c) providing an electrical current from the external power line and accumulating said current in a second capacitor as an electrical charge being of a voltage and of amount capable of energizing the electronic equipment for a time duration through which a plurality of electronic processes (either (i) to be protected against power disturbances or against electronic noise which may occur on the external power line or (ii) electronic noise generated by whom is to be avoided from the power line) may be carried out by energy provided from the second capacitor;
(d) disconnecting said second capacitor from the external power line and connecting it to the line through which the electronic equipment can be energized;
(e) substantially simultaneously with said step 'd' disconnecting the first capacitor from the line through which the electronic equipment can be energized and once again initiating said routine;

(f) repeating the routine as long as energizing the electronic device in the method is desired.

In a preferred embodiment of the method, the voltage on a capacitor currently connected to the line through which the electronic equipment can be energized is monitored, and a charging duration of a counterpart capacitor currently being charged by energy taken from a power supply line is regulated based on level changes in the monitored voltage.

In various embodiments of the method the charging duration of a capacitor currently being charged by energy taken from a power supply line is regulated by selecting a current level selected from several substantially fixed and predetermined current levels of a charging converter.

In various embodiments of the method, current consumed from a capacitor currently connected to the line through which the electronic equipment can be energized is monitored, and a charging duration of a counterpart capacitor currently being charged by energy taken from a power supply line is regulated based on the monitored current.

DETAILED DESCRIPTION OF THE INVENTION

The invention will be further described by the following Figures. These are solely intended to illustrate some exemplary embodiments of the invention and in no manner intend to limit its scope.

DETAILED DESCRIPTION OF THE FIGURES

Figure 1:
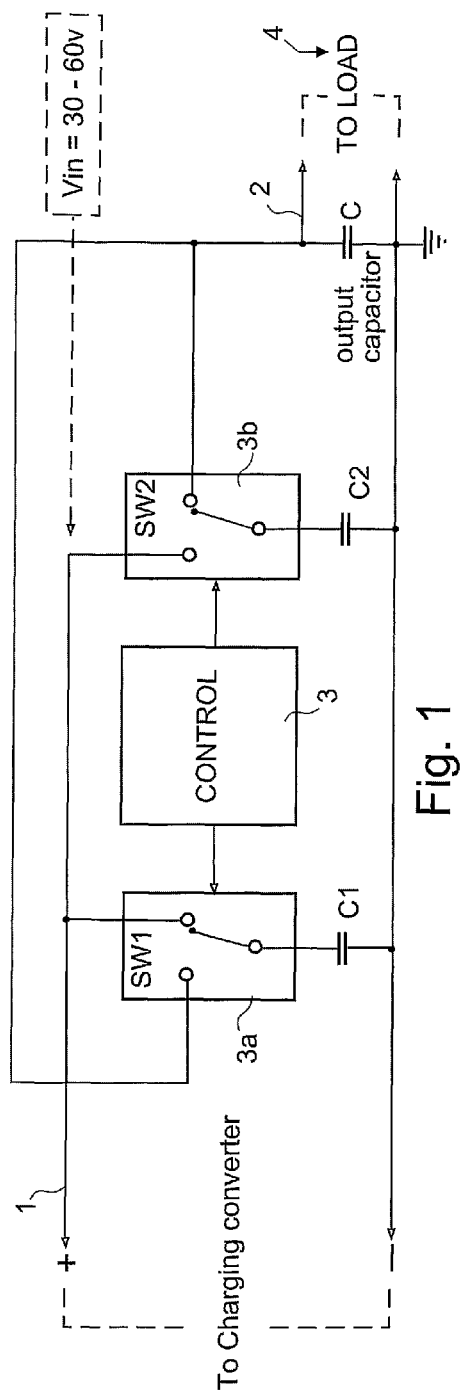
FIG. 1 illustrates a conceptual circuit of an anti-wiretapping device according to the invention in a first switching state.
Figure 2:
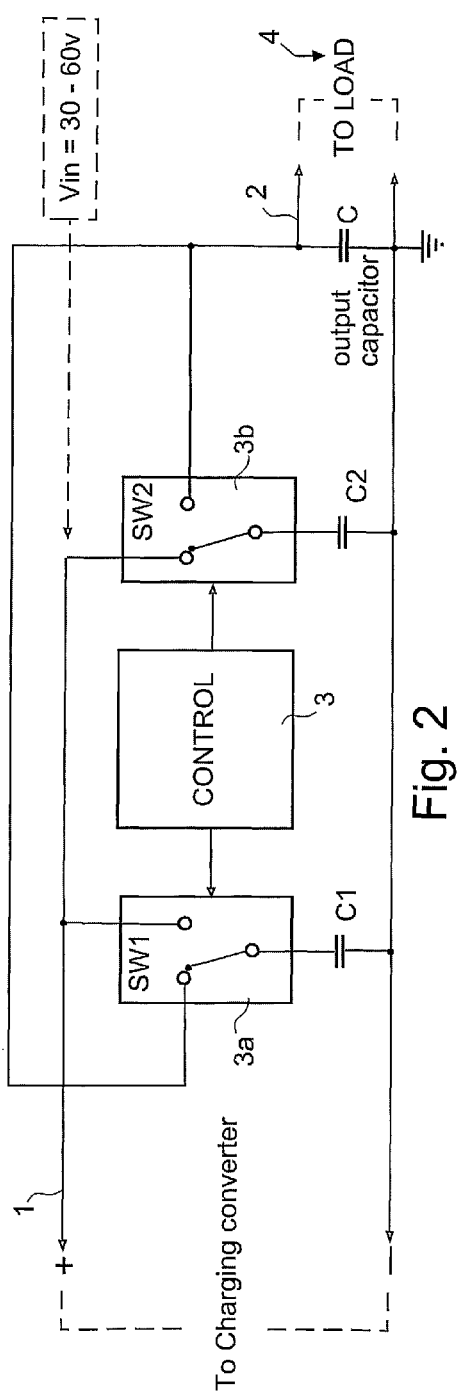
FIG. 2 illustrates the conceptual circuit illustrated by FIG. 1 in a second switching state.

FIGS. 1 & 2 illustrate a conceptual circuit of an anti-wiretapping device according to the invention in a first switching state. It should be appreciated that the device of FIGS. 1 & 2 may similarly be used for protecting electronic equipment from power disturbances and from electronic noise which may occur on power supply lines, as well as for preventing electronic noise generated by the electronic equipment from reaching the power supply lines. The description should therefore be mutatis mutandis interpreted as relating to such use.

The invention relates to a device useful for (i) anti-wiretapping, for (ii) preventing electronic noise generated by the electronic equipment from reaching the power supply lines and for (iii) protecting electronic equipment from power disturbances and from electronic noise which may occur on power supply lines; comprising a power input (1) to be connected (preferably through a charging converter and/or additional supportive circuitry) to a power supply line, a power output (2) for energizing electronic equipment (in the context of this specification referred to also as "load") intended either for anti wiretapping protection or for anti power disturbances or electronic noise protection, at least two dischargeable power storage units (C1) and (C2), and a control unit (3) for selectively connecting the power storage units, in this embodiment capacitors (C1) and (C2), to the power input (1) and to the power output (2) by means of switching units (3a) and (3b) controlled by the control unit (3), such that whenever one of the power storage units (C1) and (C2) is connected to the power output (2) it is switched off from the power input (1), and wherein at least one power storage unit (C1) or (C2) is connected to the power input (1) during a connection of another power storage unit (C2) or (C1) to the power output (2), respectively.

The electronic equipment (4) is thereby not being powered directly from the power line, thus substantially neutralizing the power supply line from signals which may be correlated with power consumption signals of confidential information, as well as from electronic noise which may be generated by the electronic equipment while also substantially neutralizing the electronic equipment (4) from power disturbances and from electronic noise which may occur on the power supply line.

The switching units (3a) and (3b) work inversely such that during a first time interval one of the capacitors (C1) and (C2) is charged from the power line (1) while the other is discharged through energizing the electronic equipment, and such that during a second time interval, substantially separate from the first, the capacitors (C1) and (C2) change their roles. In FIG. 1 the capacitor (C1) is connected to the power line through the right channel of switching unit (3a), while at the same time the capacitor (C2) is connected through the right channel of switching unit (3b) to the electronic equipment (4). As can be appreciated, the electronic equipment (4) being energized by capacitor (C2) is eliminated electronically from the power input (1), thus protected against wiretapping. Either on a time basis or on a feedback basis from the output line (2) the controller (3) is programmed to repeatedly inverse the state of the switching units (3a) and (3b) from the state illustrated in FIG. 1 to that illustrated in FIG. 2, and vice versa, thereby maintaining a sufficiently charged capacitor energizing the electronic equipment while the other capacitor temporarily remains connected to the power supply line for charging.

FIG. 2 illustrates the conceptual circuit illustrated by FIG. 1 in a second switching state wherein the capacitor (C1) is connected to the output line (2) through the left channel of switching unit (3a) thus energizing the electronic equipment (4) while being disconnected from the power input (1), and wherein the capacitor (C2) is connected to the power input (1) for charging, through the left channel of switching unit (3b).

Figure 3:
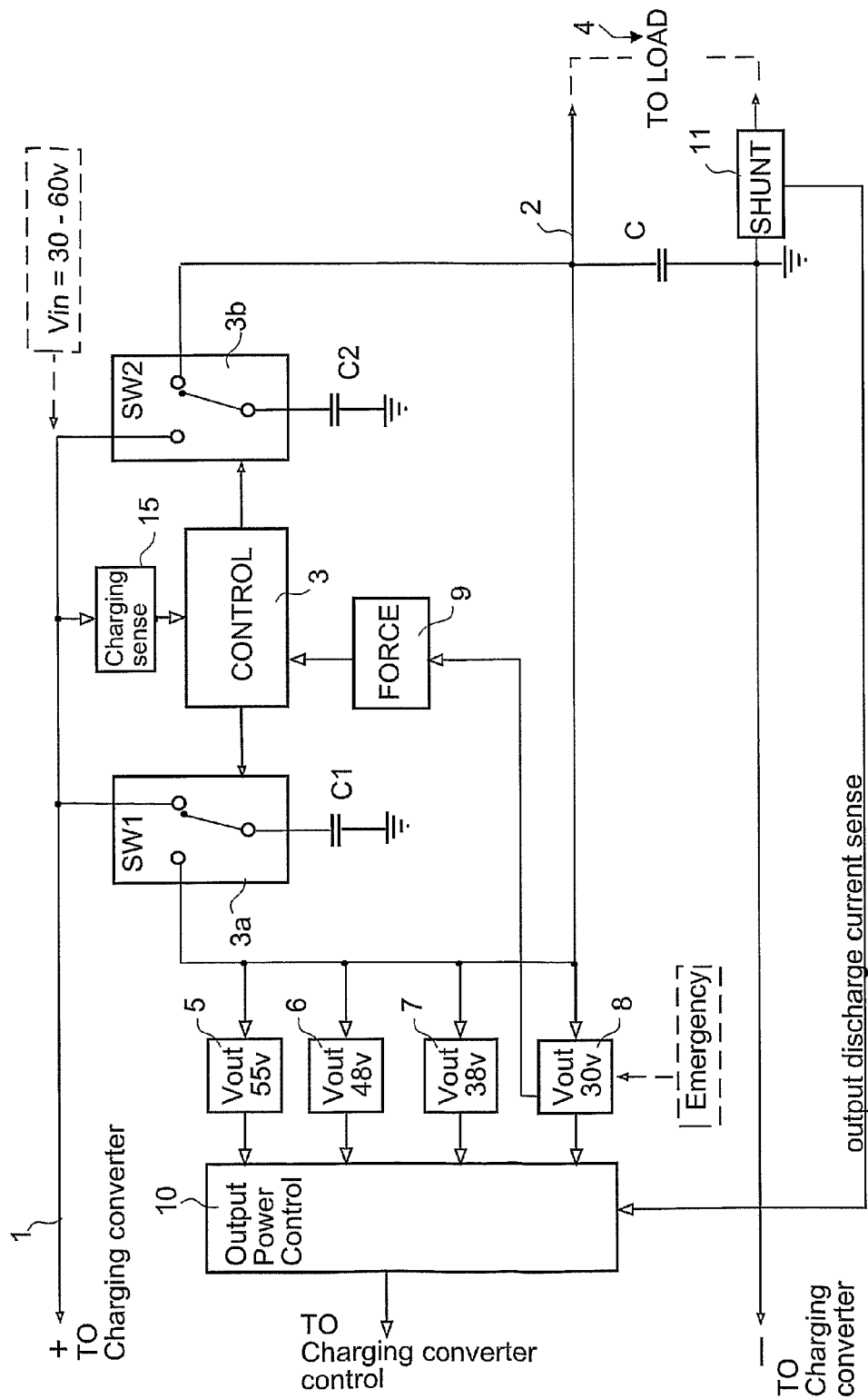
FIG. 3 illustrates the conceptual circuit of FIG. 1 with some supportive circuitry according to a basic preferred embodiment.

FIG. 3 illustrates the conceptual circuit of FIG. 1 with some supportive circuitry according to a basic preferred embodiment. In this embodiment the device is intended to provide an output voltage on the output line (2) designed to vary in the range between 30-60 volts, i.e. dropping from a maximum of 60 volts when a respective capacitor (C1) or (C2) has just been charged (preferably to said maximum voltage), to a minimum (which may not necessarily be reached) of 30 volts after said capacitor has been discharged while energizing the load (e.g. a DC/DC converter stabilizing the voltage for specific requirements of an electronic device connected to it). The output line (2) is connected to voltage level threshold sensors (5) (6) (7) and (8), configured to provide operation instructions to a charging converter control (not illustrated in this Fig.) through output power control circuit (10). The use of a plurality of voltage level threshold sensors is only an example demonstrating how the output voltage may be sampled. In other embodiments of the present invention the voltage may be sampled through a single voltage sensor having analog to digital conversion capabilities, allowing for flexibility in determining a plurality of threshold voltages. Upon recognition of voltage drop crossing any of the voltage threshold levels predetermined by voltage sensors (5) (6) (7) or (8), the output power controller (10) provides respective instruction/s to a charging converter which in turn provides as an output a predetermined level of charging current to a capacitor (C1) or (C2) temporarily connected to it through one of the respective switching units (3a) and (3b). The level of the charging current provided by the charging converter is in inverse correlation to the level of the voltage threshold which has been crossed down on the output line (2) due to a discharge of the other of the two capacitors (C2) or (C1), respectively. Accordingly, the current level provided for charging through the input line (1) is increased when a lower level of voltage has been sensed on the output line (2). The voltage threshold levels in this non limiting exemplifying embodiment are 55 v in sensor (5), 48 v in sensor (6), 38 v in sensor (7) and 30 v in sensor (8).

By such regulation the charging process may normally be accomplished using small or moderate charging currents without risking the continuity of power supplied to the electronic equipment, while higher level currents and sometimes the max available charging current of the device can be utilized only in emergency cases, normally for short time intervals, to enable timely switching between the capacitors even when the discharging process of the capacitor connected to the power output becomes intensive for any reason, causing the output voltage to drop to low voltage levels before the counterpart capacitor has reached its target voltage (i.e. 60 v in the present exemplifying embodiment).

In this embodiment the lowest voltage allowed on the output line (2) is 30 v. Accordingly, upon recognition of this level being crossed down, a Force command (9) is directed from the respective voltage sensor (8) to the control unit (3), which immediately inverses the state of switching units (3a) and (3b), thereby connecting the recently discharged capacitor (C1) or (C2) to the charging converter charging line (1), while providing the output line (2) with the freshly charged one of the two. Simultaneously, the output power control (10) responds to the signal received from voltage sensor (8) by instructing the charging converter control to return to its lowest charging current level. This will be the charging current level through the input line (1) until recognition of an output voltage crossing down the 55 v threshold level set by sensor (5), or until the voltage on the capacitor reaches its target voltage, which in this non limiting example is 60 v. The charging sense circuit (15) is configured to recognize when this voltage has been reached, and to inform the control unit (3) to inverse the states of the switching units. When the state of the switching units (3a) and (3b) is inversed, the 60 v of the freshly charged capacitor appears on the output line (2), causing the voltage sensor (5) to instruct the charging converter to supply a minimal charging current level. Upon recognition of the output voltage crossing down the 55 v threshold by sensor (5), the charging converter will be instructed to increase the charging current to a second predetermined level greater than the previous one, which will be maintained either until the max 60 v has been reached and recognized by the charging sense (15) or until recognition of an output voltage crossing down the 48 v threshold level set by sensor (6). Once again, upon recognition of the output voltage crossing down the 48 v threshold, the charging converter will be instructed to increase the charging current to a third predetermined level greater than the second one. This third current level will be maintained either until the max 60 v has been reached or until recognition of an output voltage crossing down the 38 v threshold level set by sensor (7). A fourth current level greater than the third will then be maintained by the charging converter until reaching the 60 v target voltage or until the lowest allowed 30 v voltage level has been recognized on the output (2), in which case the capacitors (C1) and (C2) will immediately switch roles by a Force command (9) initiated by sensor (8) as described above, and the charging converter will be returned to the lowest charging current level.

The device may be configured such that whenever the target voltage (60 v in the exemplifying embodiment) has been reached the controller (3) will inverse the states of the switching units (3a) and (3b), independently of the output voltage, either immediately or after a preprogrammed time delay. Alternatively, the device may be configured such that no switching will occur unless the lowest allowed voltage level (30 v in the exemplifying embodiment) has been recognized on the power output (2).

In case the device is configured to inverse the state of the switching units on a time delay, time counting may be designed to start when the target voltage has been reached, and may also be subjected to other conditions such as voltage level recognition by one or more of the voltage sensors.

The illustrated embodiment further comprises a current shunt (11) for sampling the current pulled by the load (4) for providing the output power control (10) with continuous means for estimating the output voltage drop. This option may provide for by-passing the conditions set by the voltage level sensors, in special cases. For example, the output voltage control (10) may be configured to instruct the charging converter to increase the charging current level upon recognition of relatively large currents pulled by the load, even though the output voltage level has not been dropped yet below a voltage threshold that is set to cause such increase of the charging current level through the voltage sensors (5) (6) or (7). On other hand, the output voltage control (10) may be configured to instruct the charging converter to decrease the charging current level upon recognition of relatively small currents pulled by the load, even though a signal from a voltage threshold sensor has been communicated urging for a higher current level (unjustifiably, when the output current sampling data has been considered).

Figure 4:
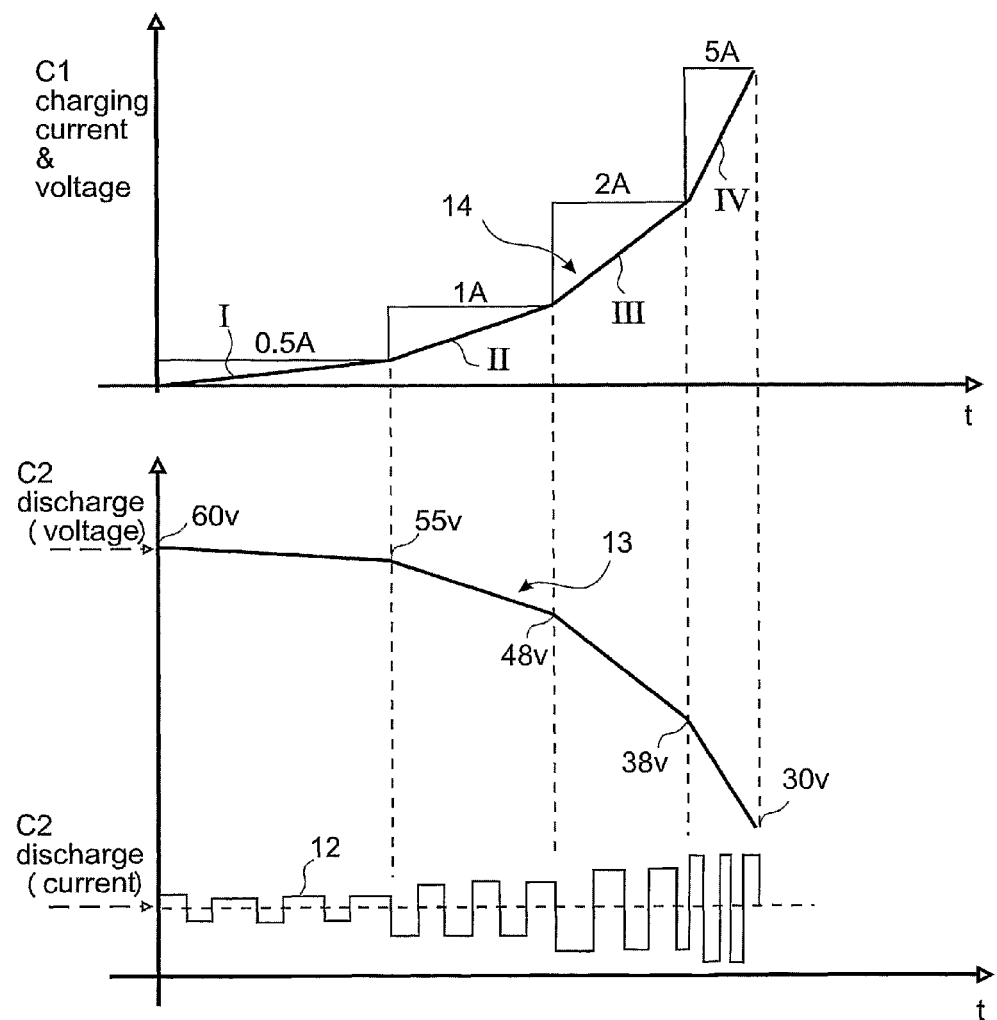
FIG. 4 illustrates a typical graph of charging current of the capacitor in a first power storage unit of the embodiment of FIG. 3 versus discharging current/voltage of a capacitor in the second power storage unit.

FIG. 4 illustrates a typical graph of charging current/voltage of the capacitor (C1) in a first power storage unit of the embodiment of FIG. 3, depicted in the upper coordinates system in the Fig., versus discharging current/voltage of a capacitor (C2) in the second power storage unit depicted in the lower coordinates system in the Fig.

The voltage on (C2) drops through time (represented by the horizontal axis (t)) from a maximum value of 60 volts on the upper left side of the lower coordinates system, to a minimum value of 30 volts on the lower right side thereof, as represented by line (13). The drop of voltage results from a varying discharge current represented by line (12). This line may actually be considered as carrying confidential data, since variations thereof may correspond to individual data pulses streaming in internal circuits of the electronic device, and any tiny signals in correlation with this current line should be eliminated from the external lines from which power is consumed. As can be appreciated, since the capacitor currently energizing the electronic device by being discharged is (C2), which during its powering role is disconnected from the external power supply lines, no residuals of its discharging currents (12) are retrievable through the external power supply lines.

During its dropping, the voltage of (C2) crosses down the voltage threshold levels of 55 v, 48 v, 38 v, and 30 v set by the voltage sensors (5) (6) (7) and (8) of FIG. 3, respectively. Correspondingly, the counterpart capacitor (C1) is being charged by different levels of charging currents supplied by the charging converter, as detailed in the following description:

When (C2) has just been connected, normally fully charged, to the power output for energizing the electronic equipment and while its voltage is dropping towards the 55 v threshold set by voltage sensor (5), a substantially fixed value of 0.5 A charging current is supplied to (C1) as represented by a respective horizontal line illustrated from above section (I) of the voltage graph (14), representing the voltage on capacitor (C1) during its charging procedure in the upper coordinates system. Upon recognition of the output voltage (i.e. the voltage on capacitor (C2)) dropping to 55 v as set by voltage sensor (5) and until recognition of the output voltage dropping to 48 v, the charging current supplied to (C1) is increased to a substantially fixed value of 1 A as represented by a respective horizontal line illustrated from above section (II) of the voltage line (14). The charging current is increased furthermore to a substantially fixed value of 2 A as represented by a respective horizontal line illustrated from above section (III) of line (14) upon recognition of the output voltage dropping to 48 v as set by voltage sensor (6). This charging current of (C1) is maintained until the voltage on (C2) drops to the next threshold—38 volts as set by voltage sensor (7), triggering an increase of the charging current of (C1) to a maximum substantially fixed value of 5 A. When the lowest threshold of 30 v set by voltage sensor (8) is reached, the capacitors (C1) and (C2) switch roles, i.e. capacitor (C1) which has just been charged becomes connected to the output line, and capacitor (C2) its value having reached the minimal allowed value of 30 v becomes connected to the output of the charging converter.

In the illustrated graphs, the voltage measured on capacitor (C1) during its charging process as represented by line (14) is depicted as continuing until the voltage on the counterpart capacitor (C2) reaches the minimum voltage allowed in the exemplifying embodiment. It should be noted that the charging process may be stopped before the voltage on (C2) drops to the minimum, i.e. capacitor (C1) may reach its target voltage (60 v in the exemplifying embodiment) thereby causing the charging current to halt, before the voltage on capacitor (C2) drops to the minimum allowed. It can thus be appreciated that the charging process may be accomplished by the relatively low 0.5 A or moderate 1 A charging current levels, while not necessarily utilizing the higher 2 A and the max available 5 A charging current levels.

Figure 5:
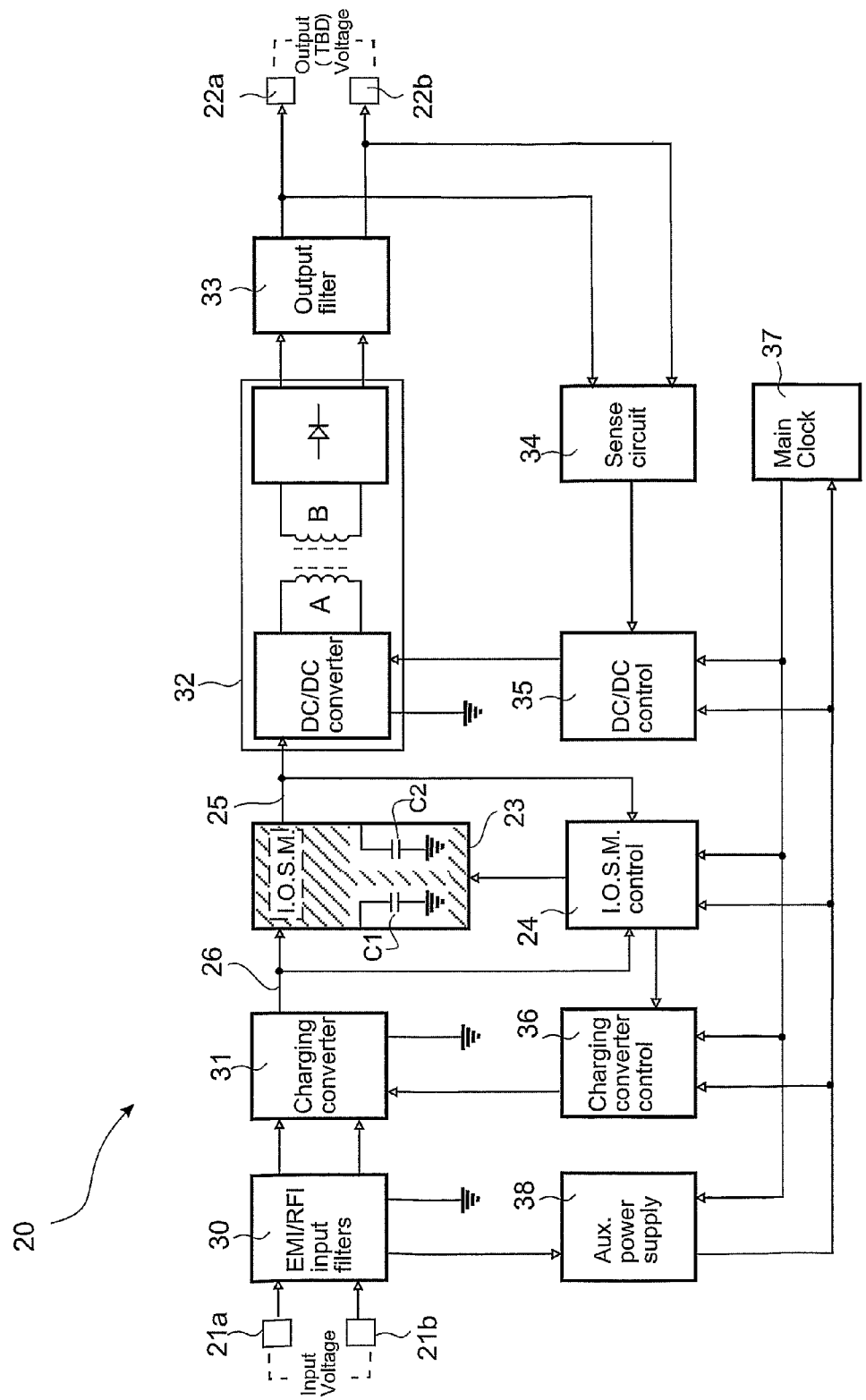
FIG. 5 illustrates an exemplifying preferred embodiment of the invention.

FIG. 5 illustrates an exemplifying preferred embodiment of the invention comprising an anti wiretapping device (20) having a power input (21a)(21b) to be connected to a power supply line, a power output (22a)(22b) for energizing electronic equipment intended for anti wiretapping protection, a pair of capacitors (C1) and (C2) constituting two dischargeable power storage units, and a switching module (23) constituting an Input/Output Separation Module (referred to also in shortcut—I.O.S.M.) for separating the power output from the power input by selectively connecting the power storage units to the power input and to the power output, such that whenever one of the power storage units (C1) or (C2) (or an equivalent power storage unit not illustrated by this embodiment but that may exist in embodiments of the invention comprising more than two power storage units) is connected to the power output (22a)(22b) it is switched off from the power input (21a)(21b), and wherein at least one power storage unit (C1) or (C2) or an equivalent power storage unit not illustrated by this embodiment but that may exist in embodiments of the invention comprising more than two power storage units) is connected to the power input (21a)(21b) during a connection of another power storage unit (either (C2) or (C1) or an equivalent power storage unit not illustrated by this embodiment but that may exist in embodiments of the invention comprising more than two power storage units) respectively, to the power output (22a)(22b).

The power storage unit connected by a switching unit (e.g. (3a) (3b) of FIG. 1) of the ISOM (23) to the power input (21a)(21b) is charged during its connection by electrical energy received from the power supply line, preferably through a charging converter (31).

An EMI/RFI (Electro Magnetic Interface/Radio Frequency Interface) input filter unit (30) may be provided for separating between the device and a public electric supply network as required by local and/or international standards.

The power storage unit connected by a switching unit (e.g. (3a) (3b) of FIG. 1) of the ISOM (23) to the power output (22a)(22b) preferably energizes the electronic equipment through a DC/DC converter (32) stabilizing and adapting its power to a desirable form and value matching the requirements of the specific electronic equipment. An output filter (33) may be provided as well according to needs. The DC/DC converter (32) may be feedback-regulated by a sense circuit (34) connected to the power output (22a)(22b) and affecting required refinements of the output power through a DC/DC control (35) of the DC/DC converter (32).

The ISOM (23) is controlled by an ISOM control circuit (24), which is monitoring the output floating voltage (25) that is actually the voltage on a power storage unit such as capacitor (C1) or (C2) currently connected to the output (25) of the ISOM (23). In the exemplifying embodiment this voltage can vary between a maximum of 60 v when the respective capacitor is charged to the predetermined maximum allowed by the charging converter (31), and between 30 v which is the predetermined minimum voltage allowed by the ISOM control circuit (24). An explanation of a control process carried out by this circuit according to the invention is provided in the description of FIGS. 3 and 4.

Further to voltage threshold level sensors such as (5)(6)(7) and (8) of FIG. 3, the ISOM control circuit (24) may be provided with a current sense obtained by a current shunt such as (11) of FIG. 3. Through the charging converter control circuit (36) the ISOM control circuit (24) controls the charging current level provided by the charging converter (31) on its output (26), through which a power storage unit such as capacitor (C1) or (C2) currently connected to the input of the ISOM (23) is being charged. The ISOM control circuit (24) further controls the switching of the ISOM (23) upon recognition that the voltage on a capacitor (C1) or (C2) of the ISOM (23) currently connected to the output (26) of the charging converter (31) has reached the target voltage (e.g. 60 v as determined in this embodiment in a non limiting manner), or upon recognition of an output voltage on the ISOM output (25) dropping to the minimum voltage allowed, e.g. 30 v as determined in this embodiment in a non limiting manner.

The control circuits and any supportive circuits such as the system clock (37) of the device are powered by auxiliary power supply (38) which is free of residual currents consumed by or which may be correlated with confidential data processed on the electronic equipment.

The invention claimed is:

1. An anti-wiretapping device, comprising:
   a power input to be connected to a power supply line:

a power output for energizing electronic equipment intended for anti wiretapping protection:

at least two dischargeable power storage units, each of the at least two dischargable er storage units comprising:

at least one capacitor to be charged from the power line during a first time interval and to be discharged while energizing the electronic equipment during a second time interval substantially separate from the first; and, a control unit for selectively connecting the at least two power storage units to the power input and to the power output, the control unit configured for regulating the charging duration of the at least one capacitor of each of the at least two power storage units by automatically selecting a charging current level from a plurality of predetermined current levels;

such that whenever one of the power storage units is connected to the power output, the one of the power storage units is switched off from the power input, and, wherein at least one power storage unit is connected to the power input during a connection of another power storage unit to the power output.

2. The anti-wiretapping device according to claim 1, wherein the control unit configured for regulating the charging duration of the at least one capacitor of each of the at least two power storage units being charged is based on a feedback from the discharging process of at least one capacitor in a power storage unit being discharged.

3. The anti-wiretapping device according to claim 2, wherein the selection of a current level is based on a voltage level of a capacitor in a power storage unit being discharged, such that whenever the voltage of a capacitor in a power storage unit being discharged crosses down a predetermined voltage threshold level, a greater charging current level is selected for charging a capacitor in a power storage unit being charged.

4. The anti-wiretapping device according to claim 1, wherein switching power storage units from a connection with the power supply line to a connection with the electronic equipment and vice versa is implemented by double switching units connecting and disconnecting simultaneously both the positive and negative poles of a power storage unit per each switching action, thereby preventing single line wiretapping.

5. The anti-wiretapping device according to claim 1, configured as a shelf product to be connected between an external power input plug of an electronic equipment and a conventional wall outlet.

6. The anti-wiretapping device according to claim 1, configured as an integral unit embedded within or connected to the casing of an electronic device as a mediating unit between a power input and an internal circuitry thereof.

7. A method for preventing wiretapping on power supply lines, comprising:

(a) providing an electrical current from a public power line and accumulating said current in a first capacitor as an electrical charge being of a voltage and of amount capable of energizing an electronic equipment for a time duration through which a plurality of electronic processes to be protected against wiretapping may be carried out by energy provided from the first capacitor;

(b) disconnecting said first capacitor from the public power line and connecting it to a line through which the electronic equipment can be energized;

(c) providing an electrical current from the public power line and accumulating said current in a second capacitor as an electrical charge being of a voltage and of amount capable of energizing the electronic equipment for a time duration through which a plurality of electronic processes to be protected against wiretapping may be carried out by energy provided from the second capacitor;

(d) disconnecting said second capacitor from the public power line and connecting it to the line through which the electronic equipment can be energized;

(e) substantially simultaneously with said step (d), disconnecting the first capacitor from the line through which the electronic equipment can be energized; and, (f) regulating, by a controller, a charging duration of the first or second capacitor currently being charged by energy taken from the public power line, by the controller automatically selecting a current level for the charging from several substantially fixed and predetermined current levels; and (g) repeating (a) through (f) for energizing the electronic device.

8. The method of claim 7, further comprising monitoring the voltage on a capacitor currently connected to the line through which the electronic equipment can be energized, and regulating a charging duration of a counterpart capacitor currently being charged by energy taken from a public power line, based on level changes in the monitored voltage.

9. The method of claim 7, further comprising monitoring current consumed from a capacitor currently connected to a protected line through which the electronic equipment can be energized, and regulating a charging duration of a counterpart capacitor currently being charged by energy taken from a public power line, based on the monitored current consumed from the capacitor connected to the protected line.

* * * * *